(12) United States Patent
Hosono et al.

(10) Patent No.: US 10,761,700 B2
(45) Date of Patent: Sep. 1, 2020

(54) DISPLAY DEVICE, SCREEN DISPLAY METHOD, AND RECORDING MEDIUM

(71) Applicant: KONICA MINOLTA, INC., Chyoda-ku, Tokyo (JP)

(72) Inventors: Masao Hosono, Itami (JP); Shigeyuki Ueda, Kodaira (JP); Tadashi Suzue, Hachioji (JP); Satoshi Osako, Toyokawa (JP)

(73) Assignee: KONICA MINOLTA, INC., Chiyoda-Ku, Tokyo (JP)

(\*) Notice: Subject to any disclaimer, the term of this patent is extended or adjusted under 35 U.S.C. 154(b) by 166 days.

(21) Appl. No.: 15/366,289

(22) Filed: Dec. 1, 2016

(65) Prior Publication Data
US 2017/0160912 A1  Jun. 8, 2017

(30) Foreign Application Priority Data

Dec. 2, 2015  (JP) .................................. 2015-235955

(51) Int. Cl.
*G06F 3/0484*  (2013.01)
*G06F 3/0486*  (2013.01)
(Continued)

(52) U.S. Cl.
CPC ........ *G06F 3/04845* (2013.01); *G06F 3/0412* (2013.01); *G06F 3/0488* (2013.01);
(Continued)

(58) Field of Classification Search
CPC combination set(s) only.
See application file for complete search history.

(56) References Cited

U.S. PATENT DOCUMENTS

2006/0242603 A1\* 10/2006 Wong .................... G06F 3/0482
715/853
2009/0031248 A1\* 1/2009 Kano .................... G06F 3/0481
715/790
(Continued)

FOREIGN PATENT DOCUMENTS

| CN | 104317504 A | 1/2015 |
| JP | 2005-352849 A | 12/2005 |
| JP | 2012-103602 A | 5/2012 |

OTHER PUBLICATIONS

Office Action (First Office Action) dated Jul. 2, 2018, by the Chinese Patent Office in corresponding Chinese Patent Application No. 201611100459.4, and an English Translation of the Office Action. (9 pages).

*Primary Examiner* — Nhat Huy T Nguyen
(74) *Attorney, Agent, or Firm* — Buchanan Ingersoll & Rooney PC

(57) ABSTRACT

A display device includes: a display; a touch panel disposed on the display; a memory that stores screen configuration information essentially including information of a base area of a fixed size and an extra area of an unfixed size; a retrieving portion that retrieves the screen configuration information therefrom; a display processor that allocates the base area in an image displayable area of the display on the basis of a reference point of the screen of the display and displays a first screen in the allocated base area, and that further allocates the extra area in an area other than the base area and displays a second screen in the allocated extra area when the image displayable area of the display is larger than the base area; and a judgment portion that judges whether or not a user stretches the extra area toward the base area on the touch panel.

12 Claims, 11 Drawing Sheets

(51) Int. Cl.
  *G06F 3/0488* (2013.01)
  *G06F 3/041* (2006.01)
  *H04N 1/00* (2006.01)

(52) U.S. Cl.
  CPC ..... *G06F 3/04847* (2013.01); *H04N 1/00411* (2013.01); *H04N 1/00472* (2013.01); *H04N 2201/0094* (2013.01)

(56) References Cited

U.S. PATENT DOCUMENTS

| | | | | |
|---|---|---|---|---|
| 2010/0088634 | A1* | 4/2010 | Tsuruta | G06F 3/0481 715/800 |
| 2010/0223561 | A1* | 9/2010 | Martin | G06F 3/048 715/752 |
| 2013/0047104 | A1* | 2/2013 | Chen | G06F 3/0481 715/765 |
| 2016/0357358 | A1* | 12/2016 | Forster | G06F 3/0481 |

\* cited by examiner

DISPLAY DEVICE, SCREEN DISPLAY METHOD, AND RECORDING MEDIUM

This application claims priority under 35 U.S.C. § 119 to Japanese Patent Application No. 2015-235955 filed on Dec. 2, 2015, the entire disclosure of which is incorporated herein by reference in its entirety.

BACKGROUND OF THE INVENTION

Field of the Invention

The present invention relates to a display device to be used, for example, in an operation panel of a multifunctional digital image forming apparatus (i.e., a multi-function peripheral abbreviated as MFP) having multiple functions such as printer function, facsimile function, and scanner function, a screen display method for the display apparatus, a recording medium, and an image processing apparatus.

Description of the Related Art

The following description sets forth the inventor's knowledge of related art and problems therein and should not be construed as an admission of knowledge in the prior art.

In recent years, various types of displays such as liquid-crystal displays to be used in operation panels of image processing apparatuses have been developed. An image processing apparatus of a recent model is capable of loading displays of various screen sizes, accordingly.

An operation screen displayed on a display can simply be enlarged or reduced to match the screen size of the display. In this case, however, text and buttons in the operation screen can become too large or small, which is not user-friendly.

An operation screen can be displayed without being enlarged on a display having a large screen and extra buttons and screens can be shown in an extra blank area in the large screen. In this case, however, there is the need for creating extra buttons and screens to be shown in the extra area that is resizable depending on the screen size, and it will take time to prepare so many extra buttons and screens.

Japanese Unexamined Patent Publication No. 2005-352849 discloses a portable information apparatus having a split-screen-enabled display that facilitates change of the ratio of a split screen to the other split screen. On this display, two split screens, i.e., an item list screen and a detail screen that shows a page of a selected item are displayed on either side of a split bar. When the user selects right or left with a direction key, the screen display control program slides the split bar to the right or left by one step as instructed. In this way, the user can easily change the ratio of a split screen to the other split screen with one hand.

Japanese Unexamined Patent Publication No. 2012-103602 discloses an image forming apparatus having a user interface that allows the user to slide an operation screen for user convenience. The image processing apparatus is provided with: a screen display processor that displays a first screen on an operation panel; a sliding display processor that slides a second screen into the first screen along a sliding path in response to a user operating the operation panel, the sliding path extending from one end to another end of a display surface, the second screen having a plurality of operation keys residing at different positions on the sliding path; a sliding processor that stops the second screen in motion in an event of a status change, the status change being identified as a predetermined condition; and an input processor that accepts inputs from at least one of the operation keys, the at least one operation key being displayed on the second screen.

The techniques disclosed in the above-referenced patent documents, however, have not been developed as solutions to the problems due to varying screen sizes of displays to be used in operation panels. When the operation screen is enlarged or reduced to match the screen size of the display, its visibility can be still poor; when an operation screen is displayed without being enlarged on a display having a large screen, there still is the need for creating extra buttons and screens to be shown in an extra blank area in the large screen, which is resizable depending on the screen size. These disclosed techniques do not bring solutions to the above-described problems.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to a display device including:

a display;

a touch panel disposed on the display;

a memory that stores screen configuration information, the screen configuration information essentially including information of a base area of a fixed size and an extra area of an unfixed size, the base area for displaying a first screen therein, the extra area for displaying a second screen therein;

a retrieving portion that retrieves the screen configuration information from the memory;

a display processor that allocates the base area in the fixed size in an image displayable area of the display on the basis of a reference point of the screen of the display with reference to the screen configuration information retrieved by the retrieving portion and displays the first screen in the allocated base area, and that further allocates the extra area in an area other than the base area and displays the second screen in the allocated extra area when the size of the image displayable area of the display is larger than the size of the base area; and a judgment portion that judges whether or not a user expands the extra area by stretching the extra area toward the base area on the touch panel, wherein, if the judgment portion judges that a user expands the extra area, the display processor stretches the extra area toward the base area and displays the second screen in the expanded extra area.

A second aspect of the present invention relates to a screen display method for a display device, the display device including:

a display;

a touch panel disposed on the display; and a memory that stores screen configuration information, the screen configuration information essentially including information of a base area of a fixed size and an extra area of an unfixed size, the base area for displaying a first screen therein, the extra area for displaying a second screen therein, the screen display method including the following steps of the display device:

retrieving the screen configuration information from the memory;

allocating the base area in the fixed size in an image displayable area of the display on the basis of a reference point of the screen of the display with reference to the retrieved screen configuration information and displaying the first screen in the allocated base area, and further allocating the extra area in an area other than the base area and displaying the second screen in the allocated extra area when the size of the image displayable area of the display is larger than the size of the base area; and judging whether or not a user expands the extra area by stretching the extra area toward the base area on the touch panel, wherein, if it is judged that a user expands the extra area, the extra area stretches toward the base area and the second screen is displayed in the expanded extra area.

A third aspect of the present invention relates to a non-transitory computer-readable recording medium storing a screen display program to be run by a computer of a display device, the display device including a display and a touch panel disposed on the display, the screen display program including screen configuration information, the screen configuration information essentially including information of a base area of a fixed size and an extra area of an unfixed size, the base area for displaying a first screen therein, the extra area for displaying a second screen therein, the screen display program making the computer to execute:

retrieving the screen configuration information from the memory;

allocating the base area in the fixed size in an image displayable area of the display on the basis of a reference point of the screen of the display with reference to the retrieved screen configuration information and displaying the first screen in the allocated base area, and further allocating the extra area in an area other than the base area and displaying the second screen in the allocated extra area when the size of the image displayable area of the display is larger than the size of the base area; and judging whether or not a user expands the extra area by stretching the extra area toward the base area on the touch panel, wherein, if it is judged that a user expands the extra area, the extra area stretches toward the base area and the second screen is displayed in the expanded extra area.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
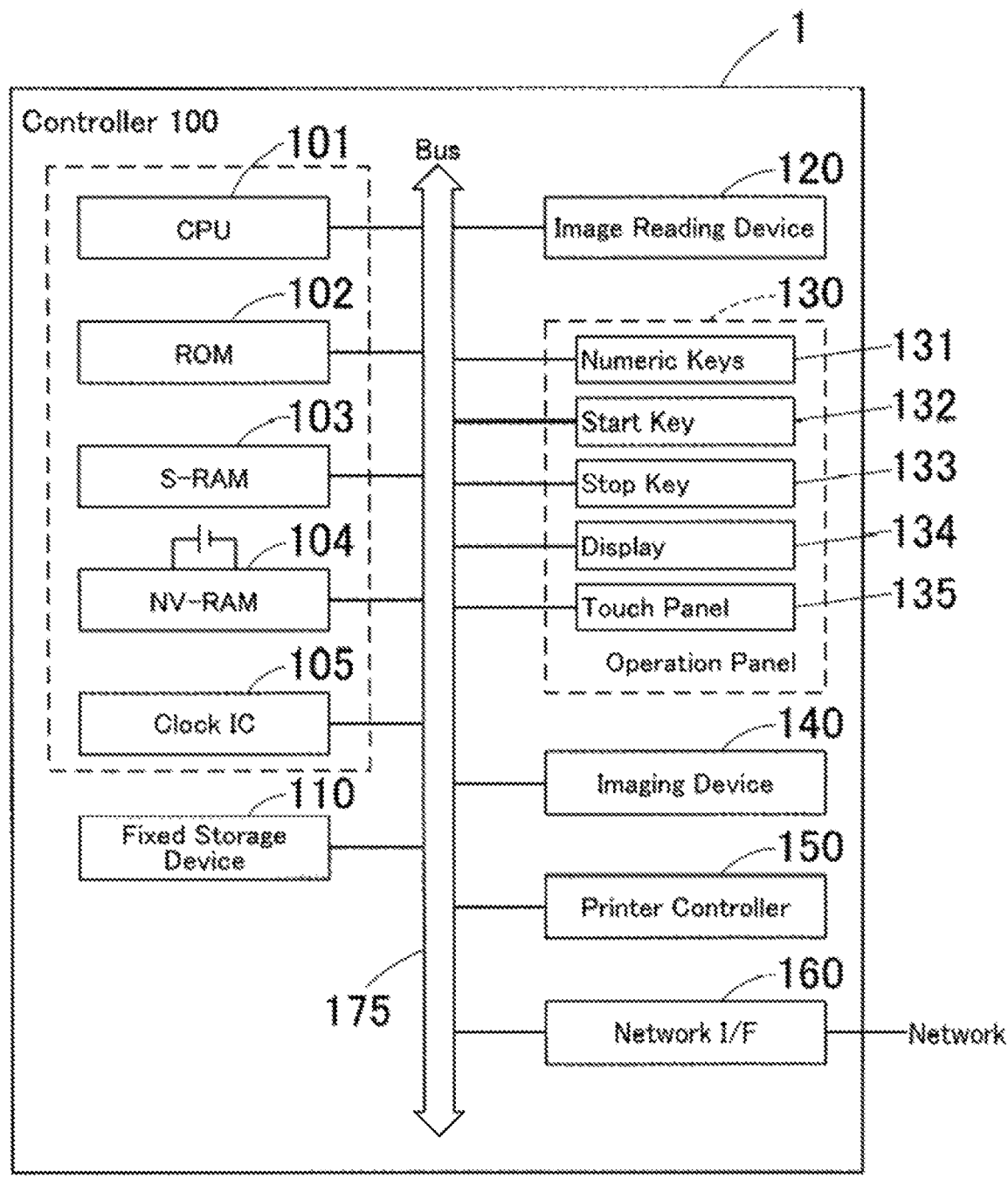
FIG. 1 is a block diagram illustrating a configuration of an image processing apparatus that is provided with a display device according to one embodiment of the present invention.

FIG. 1 is a block diagram illustrating a configuration of an image processing apparatus that is provided with a display device according to one embodiment of the present invention. It should be noted that the display device may be used in another apparatus than an image processing apparatus. In this embodiment, an MFP, i.e., a multifunctional digital image forming apparatus as described above is used as an image processing apparatus. Hereinafter, an image processing apparatuses will also be referred to as "MFP".

As illustrated in FIG. 1, the MFP 1 is provided with a controller 100, a fixed storage device 110, an image reading device 120, an operation panel 130, an imaging device 140, a printer controller 150, and a network interface (network I/F) 160, all of which are connected to each other through a system bus 175.

The controller 100 is essentially provided with a CPU 101, a ROM 102, a static random access memory (S-RAM) 103, a NV-RAM 104, and a clock IC 105.

The CPU 101 controls the MFP 1 in a unified and systematic manner by executing programs stored on a recording medium such as the ROM 102. For example, the CPU 101 controls the MFP 1 to enable the basic functions such as copier function, printer function, scanner function, and facsimile function. In this embodiment, the CPU 101 further controls the display of operation screens on the display 134 of the operation panel 130, which will be described in detail later on.

The ROM 102 stores programs for the CPU 101 to execute and other data.

The S-RAM 103 serves as a workplace for the CPU 101 to execute programs and temporarily stores the programs, data to be used by the programs, and other data.

The NV-RAM 104 is a battery backed-up non-volatile memory and stores various settings related to image forming and other data.

The clock IC 105 serves as an internal timer and essentially measures processing time.

The fixed storage device 110 consists of a hard disk drive, for example, and stores programs and other data of various types.

The image reading device 120 is essentially provided with a scanner. The image reading device 120 obtains an image by scanning a document put on a platen and converts the obtained image into image data format.

Figure 2:
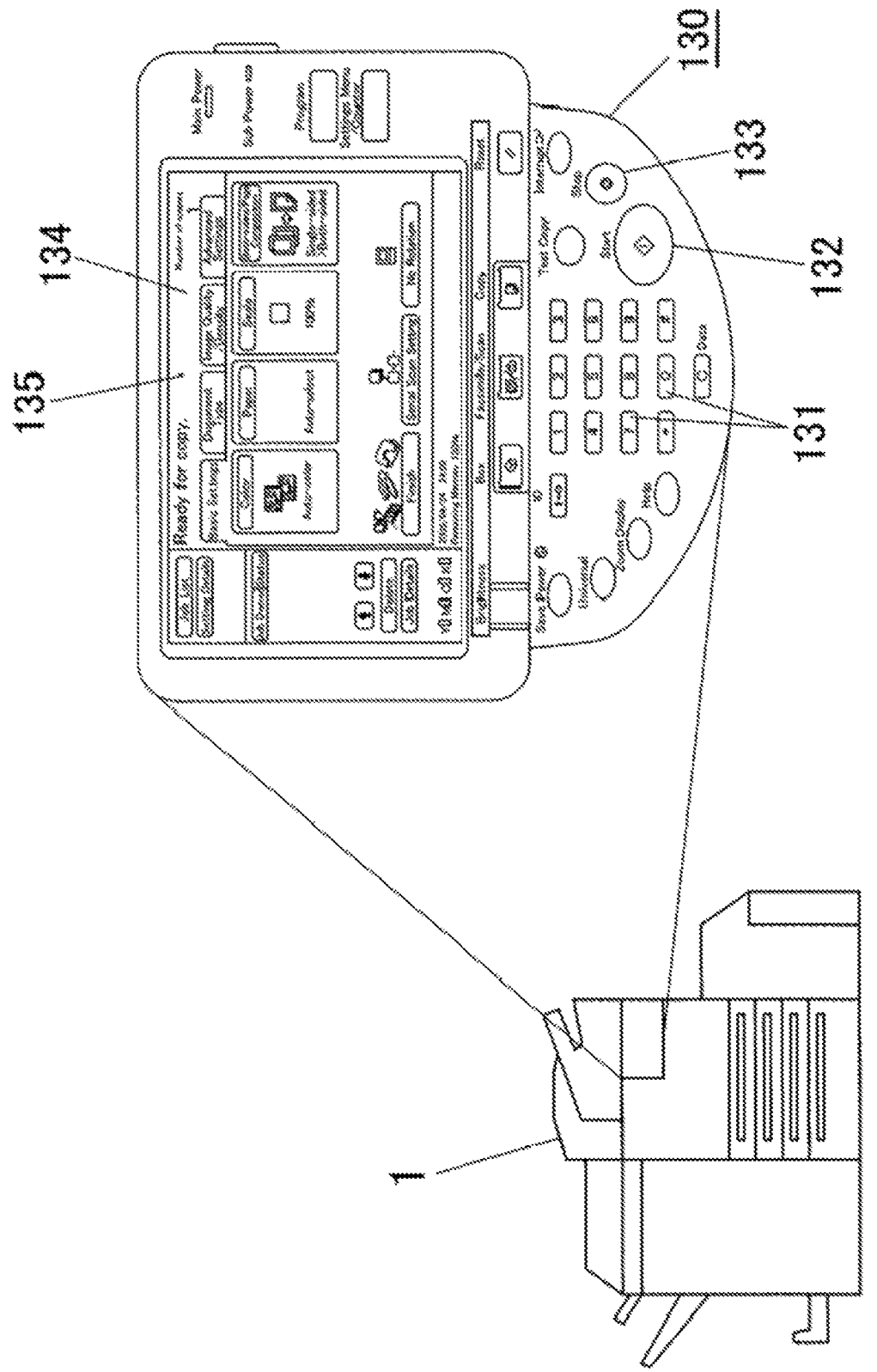
FIG. 2 illustrates an enlarged view of an operation panel of the image processing apparatus.

The operation panel 130 allows the user to give instructions such as jobs to the MFP 1 and to configure various settings of the MFP 1. As referred to the enlarged view of FIG. 2, the operation panel 130 is essentially provided with various hardware keys such as numeric keys 131, a start key 132, and a stop key 133, a display 134, and a touch panel 135.

The numeric keys 131 allow the user to configure various settings. The start key 132 allows the user to start operation, for example, start scanning. The stop key 133 allows the user to stop operation when pressed.

The display 134 consists of a liquid-crystal screen, for example, and displays messages, various operation screens, and other information. The screen size of the display 134 varies depending on the model of the MFP 1, for example.

The touch panel 135 is disposed on the screen of the display 134 and detects a touch operation by a user.

The imaging device 140 prints on paper a copy image that is formed on the basis of print data or the image data obtained from a document by the image reading device 120.

The printer controller 150 forms a copy image on the basis of print data received by the network interface 160.

The network interface (network I/F) 160 serves as a communication means that exchange data with external apparatuses such as terminal apparatuses.

The MFP 1 of FIG. 1 performs operations related to the display of operation screens on the display 134 of the operation panel 130, which will be described in detail hereinafter.

The operation programs for the CPU 101, which are stored on a recording medium such as the ROM 102, already include screen configuration information. This screen configuration information contains information of a base area 200 of a fixed size and extra areas 210 and 220 of unfixed sizes as referred to FIG. 3. Specifically, the screen configuration information essentially contains the size of the base area 200, a command for allocating the base area 200 in this size in the image displayable area of the display 134 and displaying a first screen in the base area 200, and a command for allocating the extra areas 210 and 220 in an area other than the base area 200 in the image displayable area of the display 134 and displaying second screens in the extra areas 210 and 220.

The base area 200 is an area in which a mainly used operation screen (also to be referred to as "base screen") of the MFP 1 is displayed. To show multiple keys and messages in preferred sizes for manipulation in the base screen, the size of the base area 200 should be fixed in advance. Although the size of the screen (image displayable area) of the display 134 varies depending on the model of the MFP 1, the size of the base area 200 is fixed and common.

The extra areas 210 and 220 each are an area in which a screen other than the base screen such as a screen for special use is displayed. To fit various screen sizes of the displays 134, the sizes of the extra areas 210 and 220 should be unfixed.

The CPU 101 of the MFP 1 retrieves information of the base area 200 and the extra areas 210 and 220 from the screen configuration information included in the operation programs. The CPU 101 then compares the information to the screen size of the display 134 of the MFP 1, which is stored in advance on the NV-RAM 104, for example. When the screen size is larger than the size of the base area 200, the CPU 101 allocates the base area 200 in the image displayable area of the display 134, as referred to FIG. 3. The base area 200 is allocated on the basis of a reference point of the screen. In this embodiment, a reference point P is set in advance at the upper-left corner of the screen. The upper-left corner of the base area 202 is matched to the reference point P of the screen, and the base area 200 is allocated in its fixed size in the image displayable area of the display 134.

Figure 3:
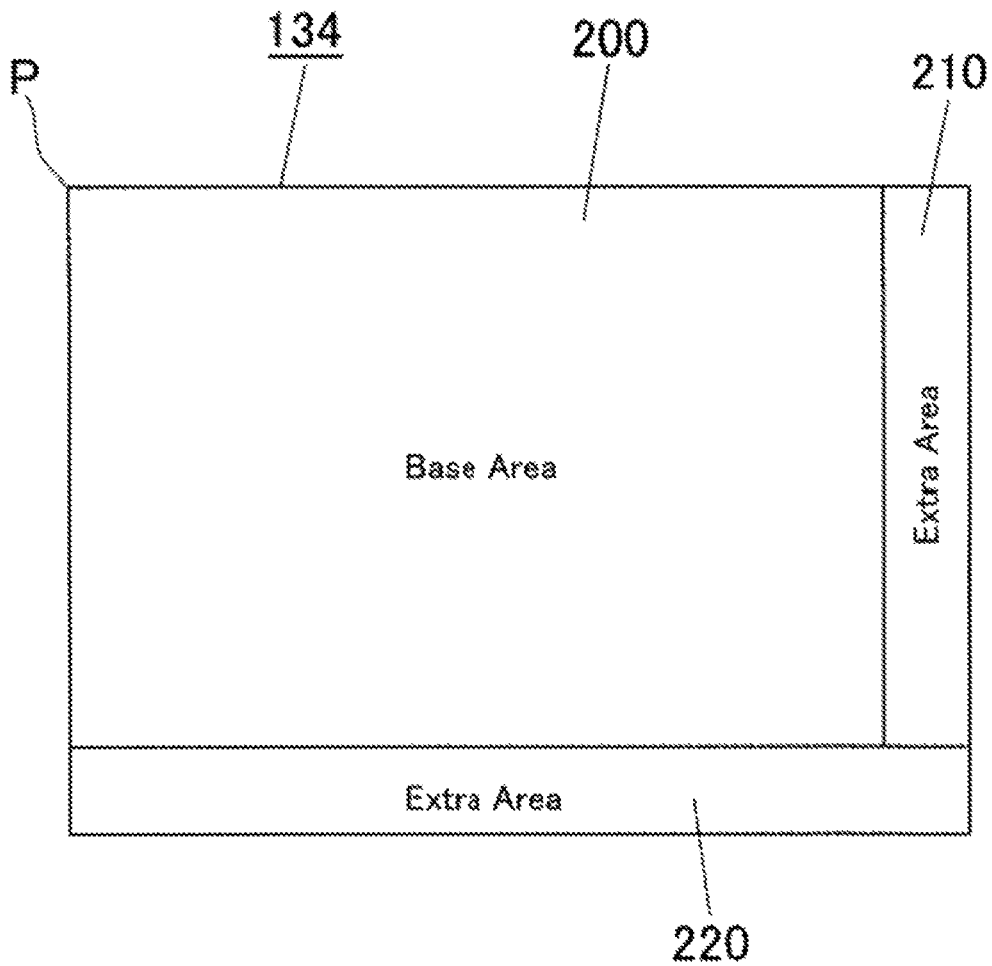
FIG. 3 is an explanatory view of a base area and extra areas allocated in the image displayable area of the display device.

Meanwhile, the extra areas 210 and 220 are allocated in an area other than the base area 200 in the image displayable area of the display 134. As a result of all these operations, the base area 200 resides in the upper-left part of the screen of the display 134, the extra area 210 resides on the right side of the base area 200, and the extra area 220 resides on the lower side of the base area 200, as illustrated in FIG. 3.

After allocating the base area 200 and further allocating the extra areas 210 and 220 if needed, the CPU 101 of the MFP 1 displays the mainly used operation screen (base screen) in the base area 200 and further displays other screens in the extra areas 210 and 220 if needed.

When the length of the base area 200 matches the same of the screen, only the extra area 210 is allocated in addition to the base area 200. When the width of the base area 200 matches the same of the screen, only the extra area 220 is allocated in addition to the base area 200. When both the length and width of the base area 200 match the same of the screen, only the base area 200 is allocated.

The screens to be displayed in the extra areas 210 and 220 are not limited to but may include a job log screen and a shortcut menu screen with shortcut icons. Those screens also may include a screen related to the operation screen displayed in the base area 200. Those screens also may include a preview screen that shows what the operation screen will look like in the base area 200 when it is customized according to user preferences. Those screens also may include a preview screen that shows what a document, for example, will look like on printed paper when it is selected from a storage of the MFP 1 for printing.

Those screens to be displayed in the extra areas 210 and 220 may be larger than the extra areas 210 and 220; in this case, the screens are displayed therein as far as the size conditions allow.

Figure 4A:
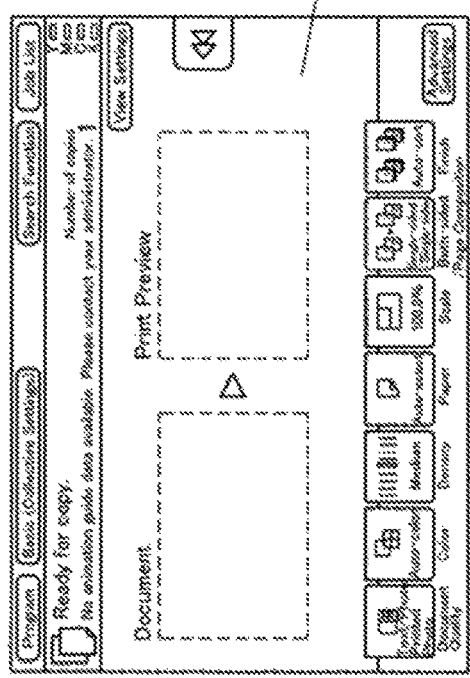
FIGS. 4A, 4B, and 4C are explanatory views of a base area and extra areas allocated in different ways depending on the screen size of the display device.
Figure 4B:
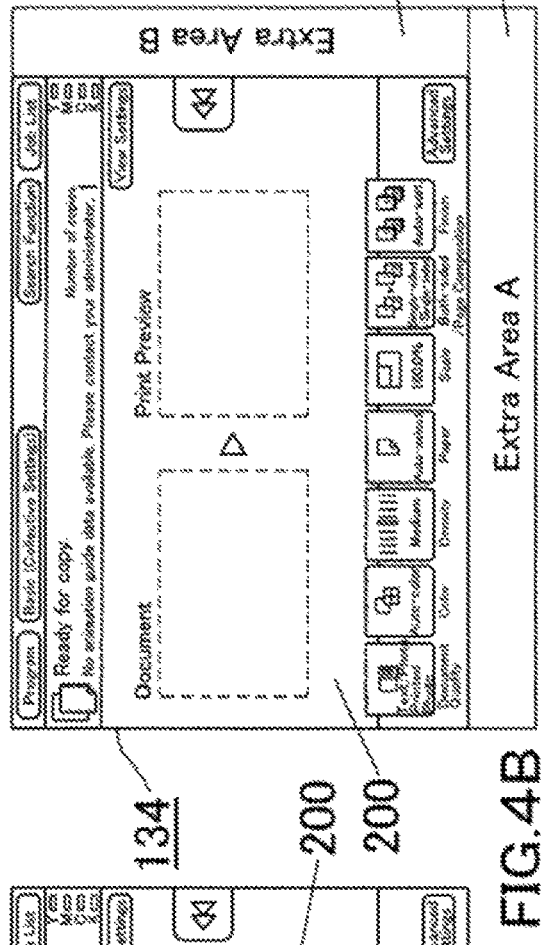
Figure 4C:
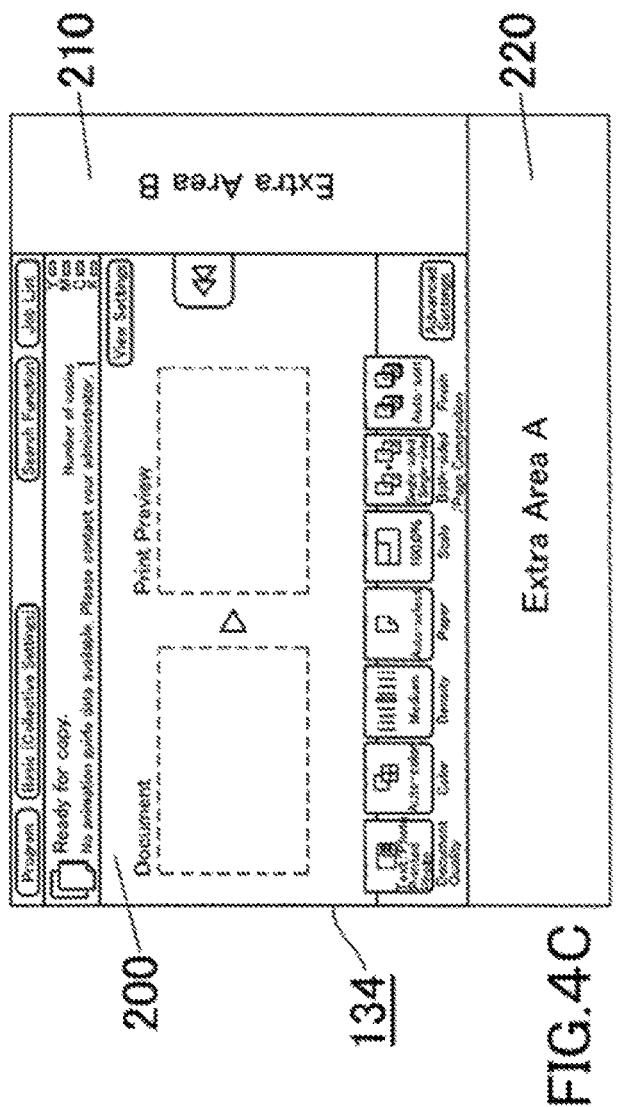

As described above, in this embodiment, screen configuration information including information of the base area 200 of a fixed size and the extra areas 210 and 220 of unfixed sizes is prepared as common information among all MFPs 1 and stored in advance on a recording medium such as a ROM of every MFP 1. By retrieving this screen configuration information therefrom, the MFP 1 can allocate the base area 200 in its fixed size. The screen size of the display 134 may match the size of the base area 200, as illustrated in FIG. 4A; the screen size of the display 134 may be larger than the size of the base area 200 in both length and width, as illustrated in FIG. 4B; the screen size of the display 134 may be still much larger than the size of the base area 200, as illustrated in FIG. 4C. In any of these cases, the base area 200 is allocated in its fixed and common size without reference to the screen size of the display 134. When the screen size of the display 134 is larger than the size of the base area 200, the extra areas 210 and 220 are adjusted to fit the size of an area other than the base area 200 and allocated therein. When the screen size of the display 134 is still much larger, the extra areas 210 and 220 are enlarged accordingly and allocated therein.

As described above, the base area 200 is allocated in its fixed and common size in the screen (image displayable area) of the display 134, the size of which varies depending on the model of the MFP 1. This embodiment eliminates the need for enlarging or reducing the operation screen depending on the screen size of the display 134 and the need for creating extra screens. Accordingly, this embodiment can bring a simple solution to the problems due to various screen sizes.

Figure 5:
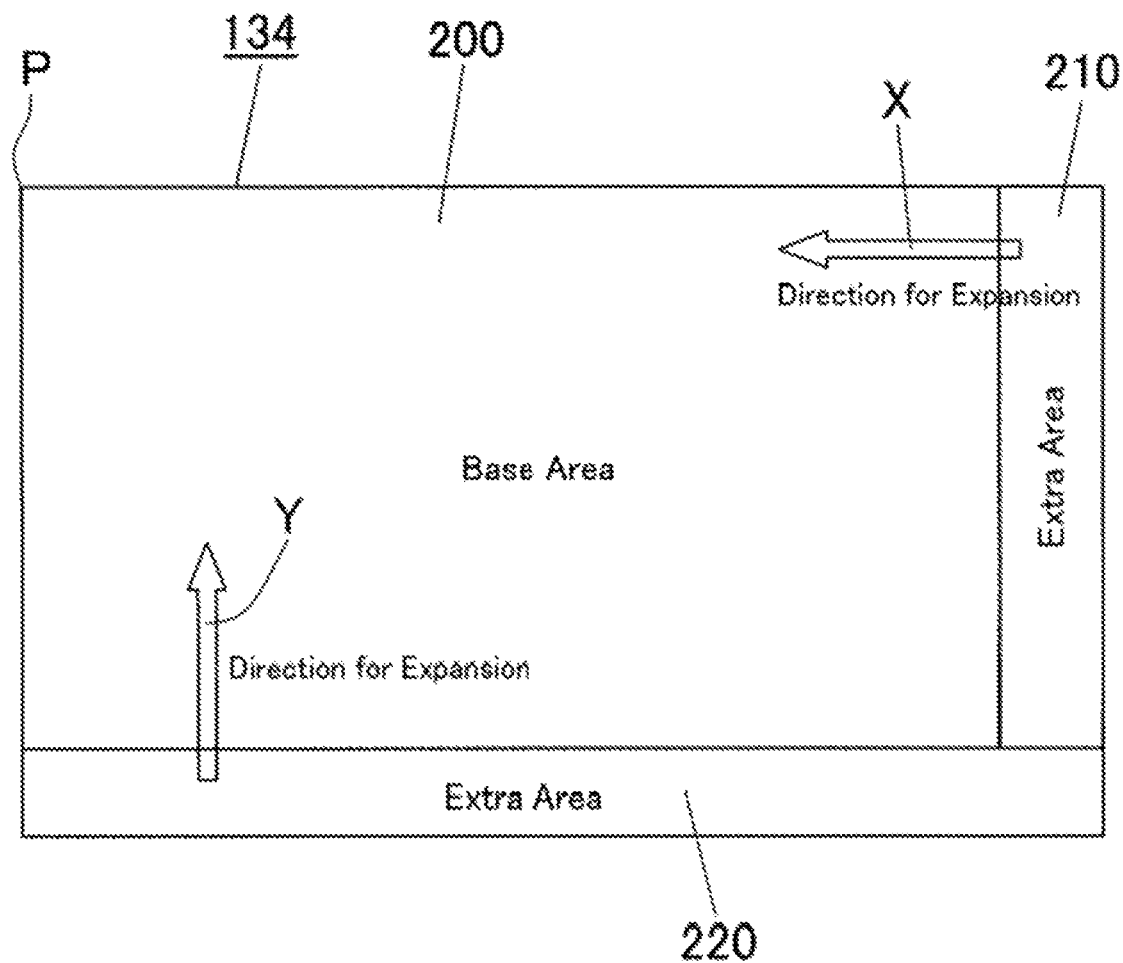
FIG. 5 is an explanatory view of how to expand the extra areas.

Furthermore, in this embodiment, the extra areas 210 and 220 stretch toward the reference point P. Specifically, as referred to FIG. 5, the user can expand the extra area 210 by stretching the extra area 210 to the left, in a direction for expansion (in a direction indicated by arrow X) on the screen; in this case, the blank area stretches to the left to become larger. Similarly, the user can expand the extra area 220 by stretching the extra area 220 upward, in a direction for expansion (in a direction indicated by arrow Y) on the screen; in this case, the blank area that is the extra area 220 stretches upward to become larger.

Figure 6:
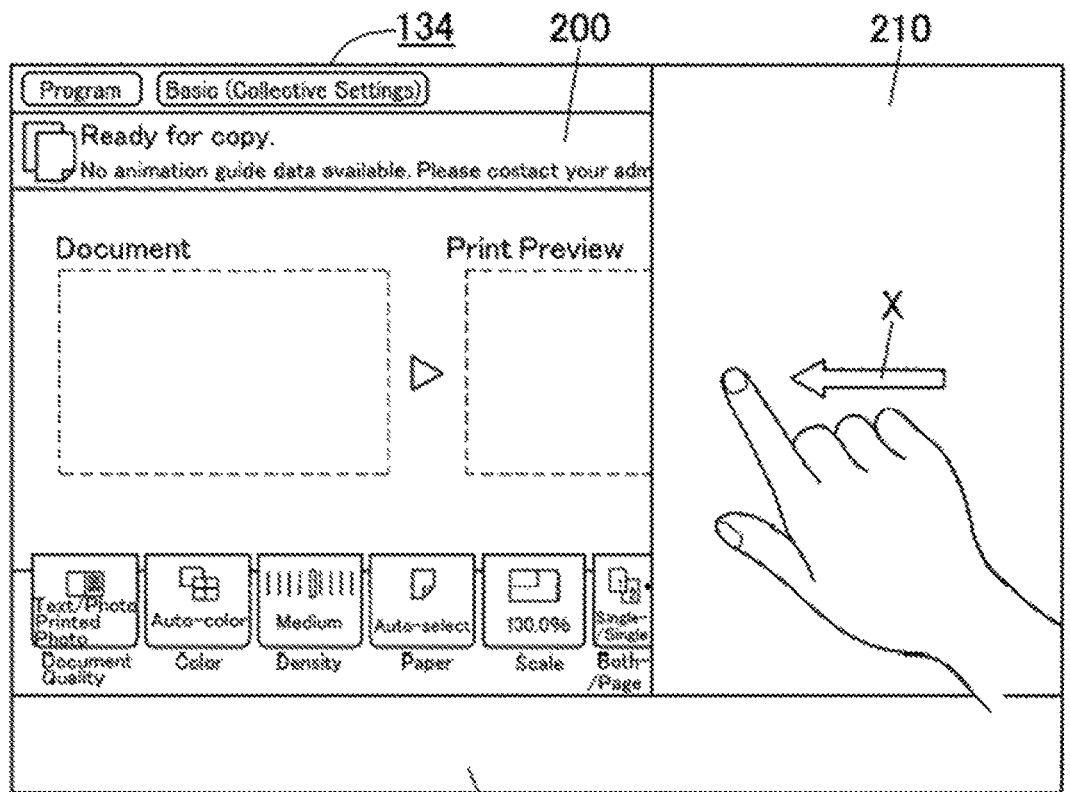
FIG. 6 is an illustrative example of how to expand an extra area.

As referred to FIG. 6, the user can expand the extra areas (e.g., the extra area 210) by performing a first operation that consists of, for example, touching the extra area 210 with a finger and sliding the finger (touch point) to the left, in the direction X toward the base area 200. Upon this manipulation, the extra area 210 expands while the base screen displayed in the base area 200 remains motionless. In other words, the extra area 210 gradually expands in such a manner that it wipes off the base screen displayed in the base area 200, and the base screen displayed in the base area 200 gradually hides behind the extra area 210 from the right side. The extra area 210 is capable of expanding until a side of the extra area 210, which is adjacent to base area 200, reaches one side (the left side) of the screen that is the image displayable area. Similarly, the user can expand the extra area 220 by touching the extra area 220 with a finger and sliding the finger (touch point) upward.

Meanwhile, the user also can reduce the extra areas 210 and 220 by touching the extra areas 210 and 220 with a finger and sliding the finger in a direction opposite to the direction for expansion.

Figure 7:
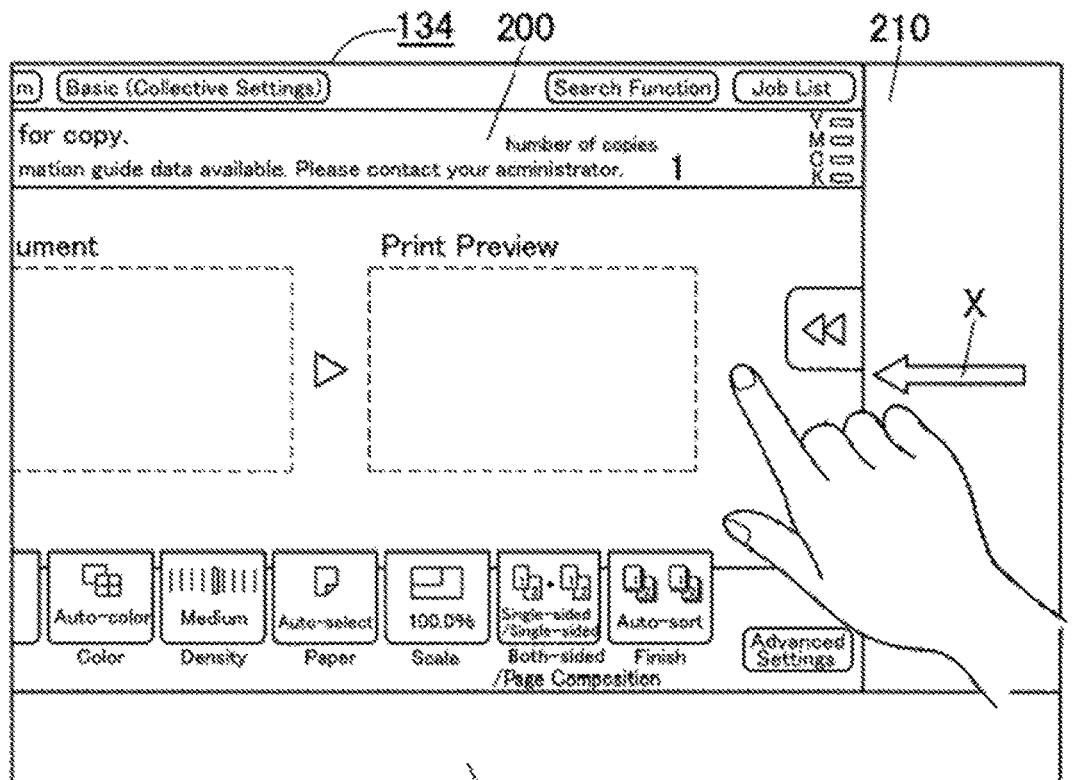
FIG. 7 is another illustrative example of how to expand an extra area.

As referred to FIG. 7, the user can expand the extra areas (e.g., the extra area 210) by performing a second operation that consists of, for example, touching the base area 200 with a finger and sliding the finger (touch point) to the left, in the direction X away from the extra area 210. Upon this manipulation, the extra area 210 expands while the base screen displayed in the base area 200 slides away from the extra area 210. In other words, the extra area 210 gradually expands in such a manner that it pushes the base screen displayed in the base area 200, and the base screen displayed in the base area 200 gradually hides from the left side. The extra area 210 is capable of expanding until a side of the extra area 210, which is adjacent to the base area 200, reaches one side (the left side) of the screen that is the image displayable area. Similarly, the user can expand the extra area 220 by touching the base area 200 with a finger and sliding the finger (touch point) upward.

Meanwhile, the user also can reduce the extra areas 210 and 220 by touching the base area 200 with a finger and sliding the finger in a direction opposite to the direction for expansion.

Figure 8:
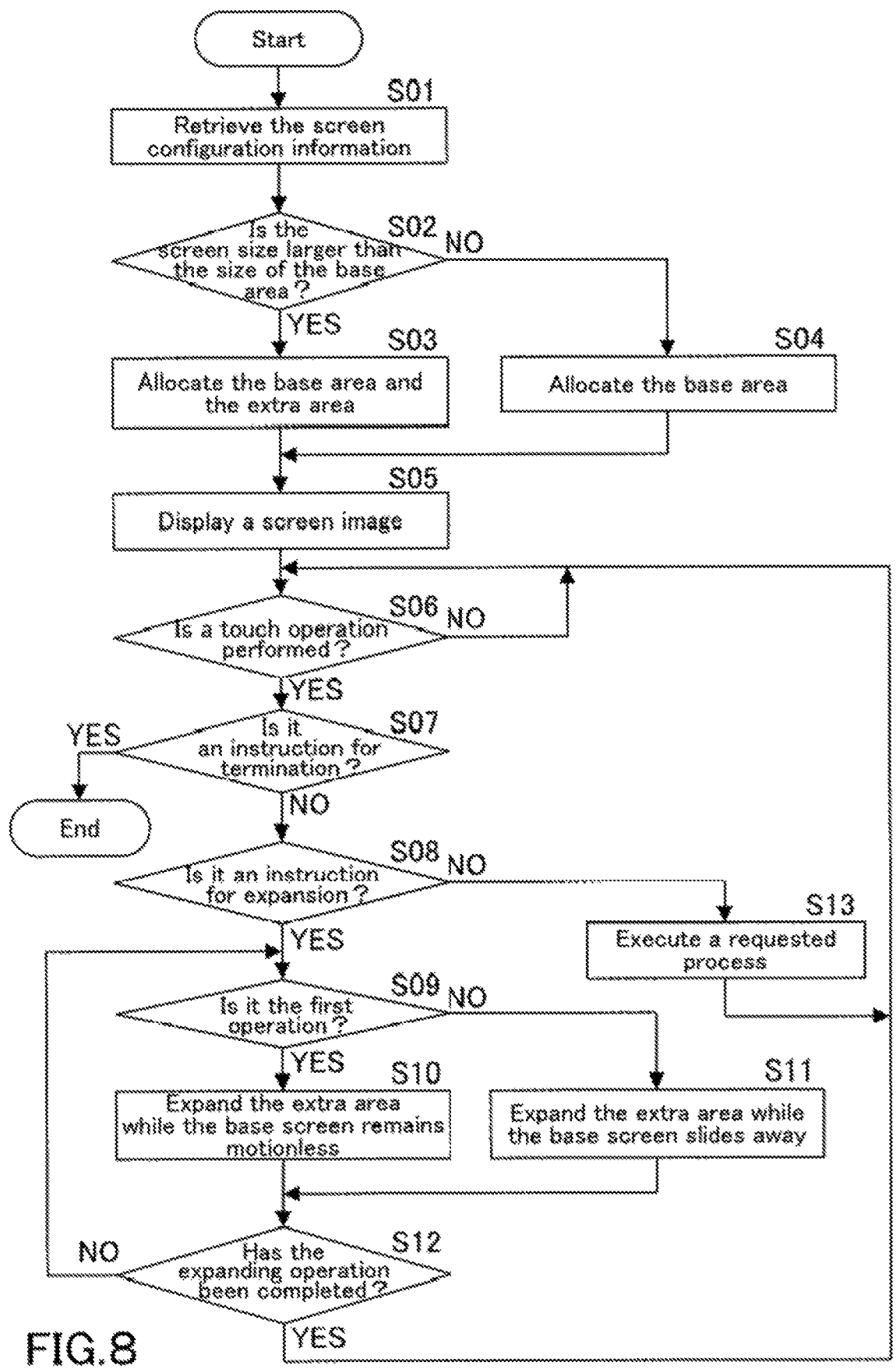
FIG. 8 is a flowchart representing a screen display control operation of the image processing apparatus.

FIG. 8 is a flowchart representing an operation screen display control operation of the MFP 1. This operation is executed by the CPU 101 of the MFP 1 in accordance with an operation program stored on a recording medium such as the ROM 102.

In Step S01, the screen configuration information is retrieved from the program. In Step S02, it is judged whether or not the screen size of the display 134 is larger than the size of the base area 200, which is included in the screen configuration information. If the screen size of the display 134 is larger than the size of the base area 200 (YES in Step S02), the base area 200, the extra area 210, and the extra area 220 are allocated in the image displayable area of the display 134 in Step S03. The flowchart then proceeds to Step S05. If the screen size of the display 134 is not larger than the size of the base area 200 (NO in Step S02), the base area 200 is allocated in the image displayable area of the display 134 in Step S04. The flowchart then proceeds to Step S05.

In Step S05, an image of an operation screen (base screen) is displayed in the base area 200. Other images are also displayed in the extra areas 210 and 220 allocated in Step S03, if needed.

In Step S06, the flowchart waits until a touch operation is performed (NO in Step S06). If a touch operation is performed (YES in Step S06), it is judged in Step S07 whether or not the touch operation is an instruction for terminating the operation. If it is an instruction for terminating the operation (YES in Step S07), the flowchart terminates. If it is not an instruction for terminating the operation (No in Step S07), the flowchart proceeds to Step S08.

In Step S08, it is judged whether or not the touch operation is an instruction for expanding the extra area. If it is not an instruction for expanding the extra area (NO in Step S08), a requested process is executed in Step S13. The flowchart then returns to Step S06 to wait until another touch operation is performed.

If it is an instruction for expanding the extra area (YES in Step S08), it is then judged in Step S09 whether or not the touch operation is the first operation, which consists of touching the extra area (e.g., the extra area 210) and sliding the touch point. If it is the first operation (YES in Step S09), the flowchart proceeds to Step S10, in which the extra area 210 stretches toward the base area 200 to show an image while the base screen displayed in the base area 200 remains motionless. The flowchart then proceeds to Step S12. If it is not the first operation (NO in Step S09), it must be the second operation, thus the flowchart proceeds to Step S11, in which the extra area 210 stretches toward the base area 200 to show an image while the base screen displayed in the base area 200 slides away. The flowchart then proceeds to Step S12.

In Step S12, it is judged whether or not the expanding operation has been completed. If it has not been completed (NO in Step S12), the flowchart returns to Step S09 to repeat Steps S09 to S12. If the expanding operation has been completed (YES in Step S12), the flowchart returns to Step S06 to wait until another touch operation is performed.

Figure 9A:
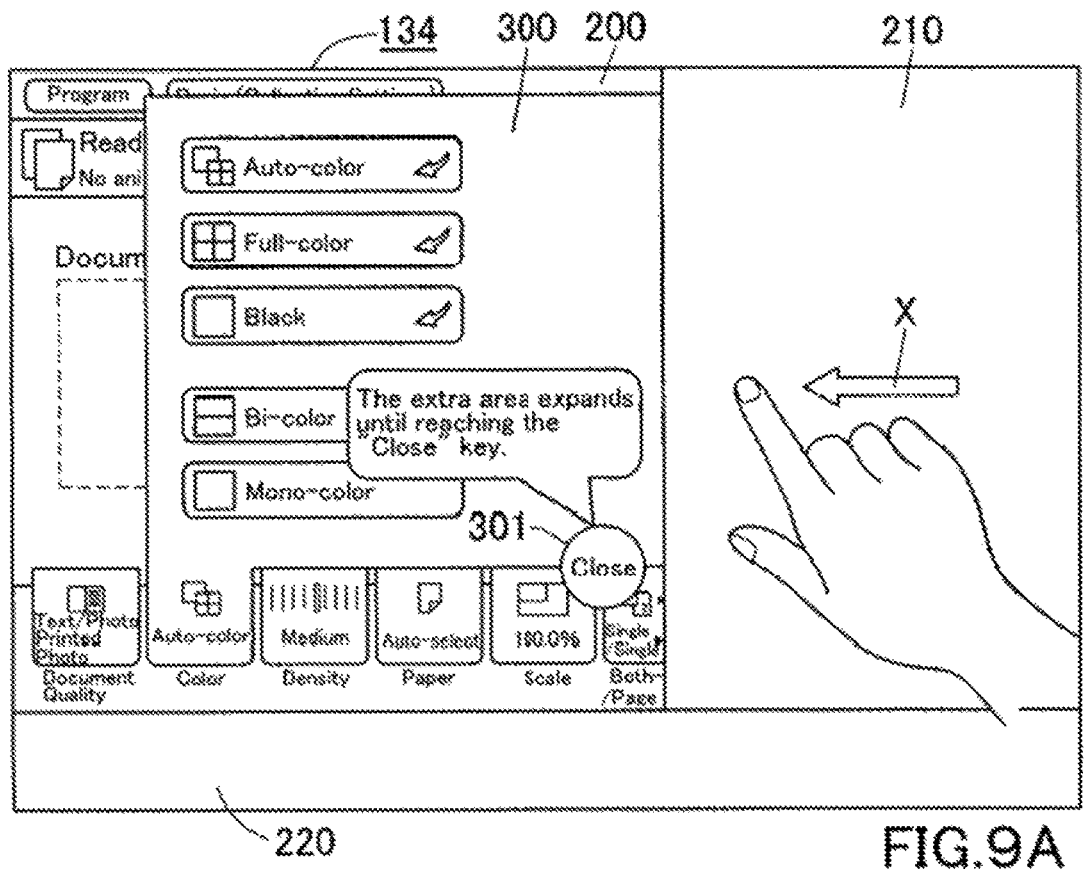
FIGS. 9A and 9B are explanatory views of a screen display control operation according to another embodiment of the present invention.
Figure 9B:
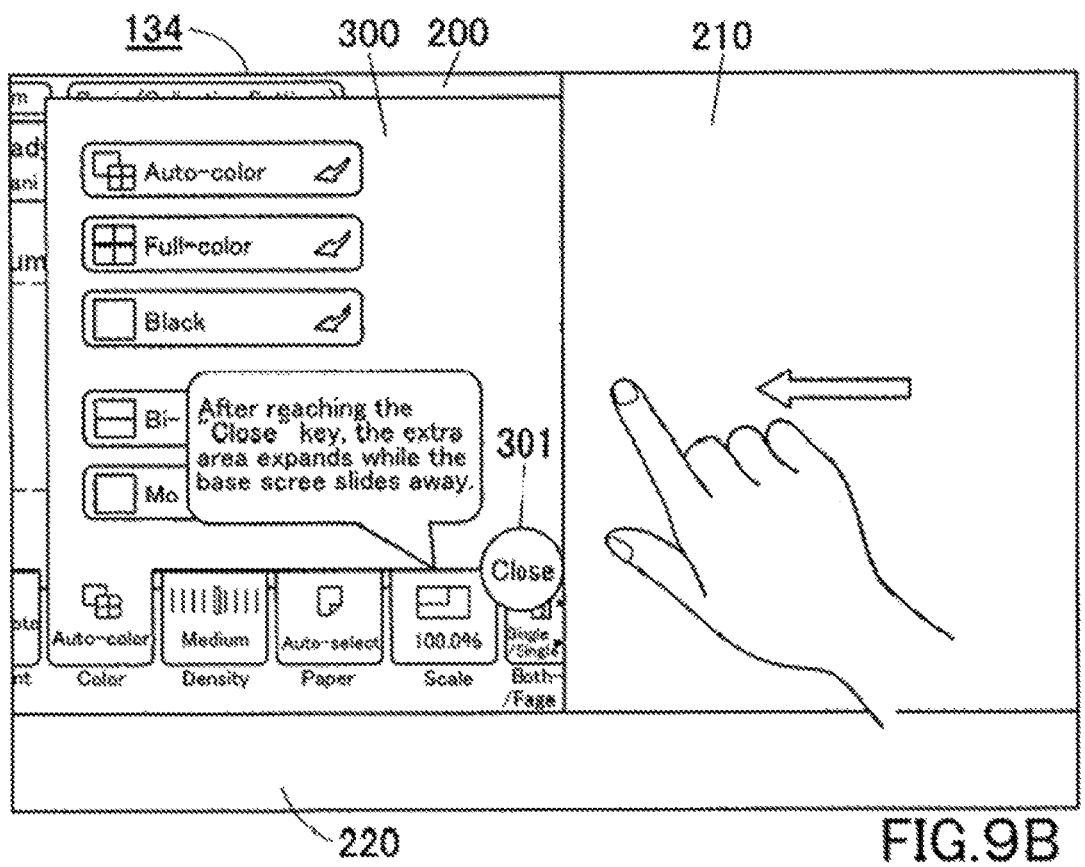

FIGS. 9A and 9B are explanatory views of a screen display control operation according to another embodiment of the present invention. In this embodiment, the keys priority mode for giving priority to the display of the keys in the base screen displayed in the base area 200 is activated. In this mode, as referred to FIG. 9A, the user touches the extra area (e.g., the extra area 210) with a finger and sliding the finger to the direction X that is the direction for expansion.

Some active keys are currently shown in the base screen (including a pop-up window 300) displayed in the base area 200, and one of the active keys is specified in advance. Until reaching this specified key, for example, a key 310 that is the closest key to the extra area 210, as referred to FIG. 9A, the extra area 210 expands while the base screen displayed in the base area 200 remains motionless. After reaching the key 301 that is the closest key to the extra area 210, as referred to FIG. 9B, the extra area 210 expands while the base screen displayed in the base area 200 slides away. With this configuration, the extra area 210 will expand without hiding any active keys in the base screen, allowing the user to continue operation with the keys. The keys priority mode may be activated by a user with administrator authority, for example, or by default.

Figure 10A:
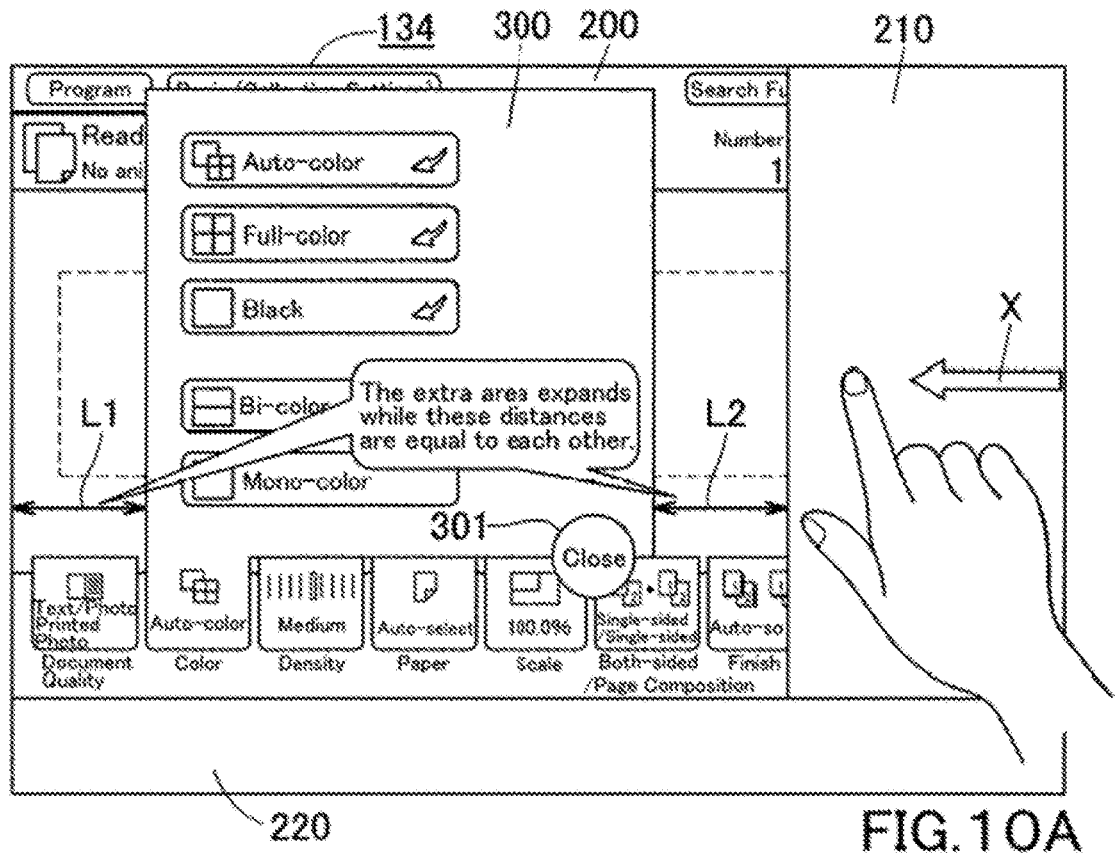
FIGS. 10A and 10B are explanatory views of a screen display control operation according to yet another embodiment of the present invention.
Figure 10B:
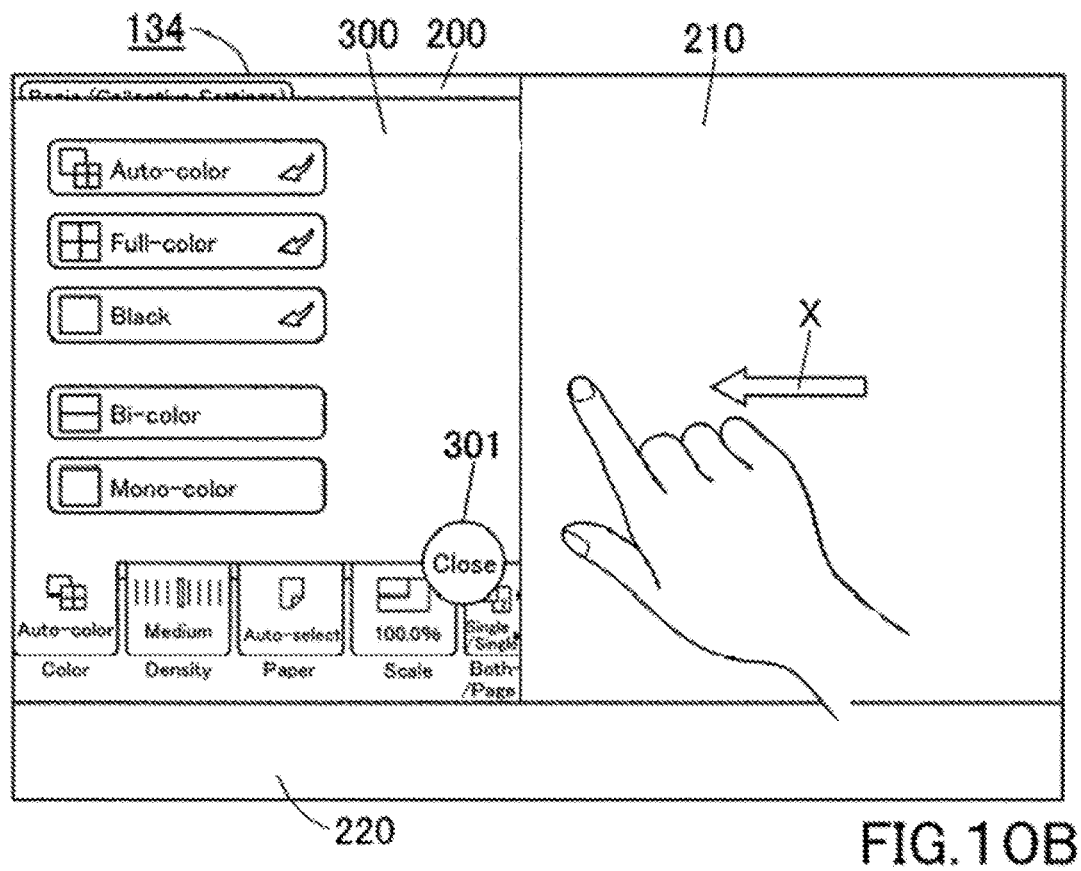

FIGS. 10A and 10B are explanatory views of a screen display control operation according to yet another embodiment of the present invention. In this embodiment, the pop-up window priority mode for giving priority to the display of the pop-up window 300 in the base screen displayed in the base area 200 is activated. In this mode, the user touches the extra area 210 with a finger and sliding the finger to the direction for expansion.

As referred to FIG. 10A, the user touches the extra area 210 with a finger and sliding the finger in the direction X that is the direction for expansion. Upon this manipulation, the extra area 210 expands while the base screen displayed in the base area 200 slides away from the extra area 210. Meanwhile, the pop-up window 300 slides away while being displayed in the center of the base area 200. In other words, the pop-up window 300 slides away while distances L1 and L2 are equal to each other. The distance L1 is the distance between the forward side of the pop-up window 300 in the sliding direction and the left side of the base area 200, and the distance L2 is the distance between the backward side of the pop-up window 300 in the sliding direction and the right side of the base area 200. With this configuration, the extra area 210 will expand without losing the visibility of the pop-up window 300 for the user.

As referred to FIG. 10B, the forward side of the pop-up window 300 in the sliding direction reaches the left side of the base area 200 (the left side of the display screen), and the left side of the extra area 210 simultaneously reaches the backward side of the pop-up window 300 in the sliding direction. In this condition, the extra area 210 can further expand to hide the pop-up window 300 behind itself. To avoid this, a similar configuration to the embodiment of FIGS. 9A and 9B may be used. That is, until reaching the key 310 that is the closest key to the extra area 210, the extra area 210 may expand while the base screen displayed in the base area 200 remains motionless. After reaching the key 301 that is the closest key to the extra area 210, the extra area 210 may expand while the base screen displayed in the base area 200 slides away.

The pop-up window priority mode may be activated by a user with administrator authority, for example, or by default.

Figure 11A:
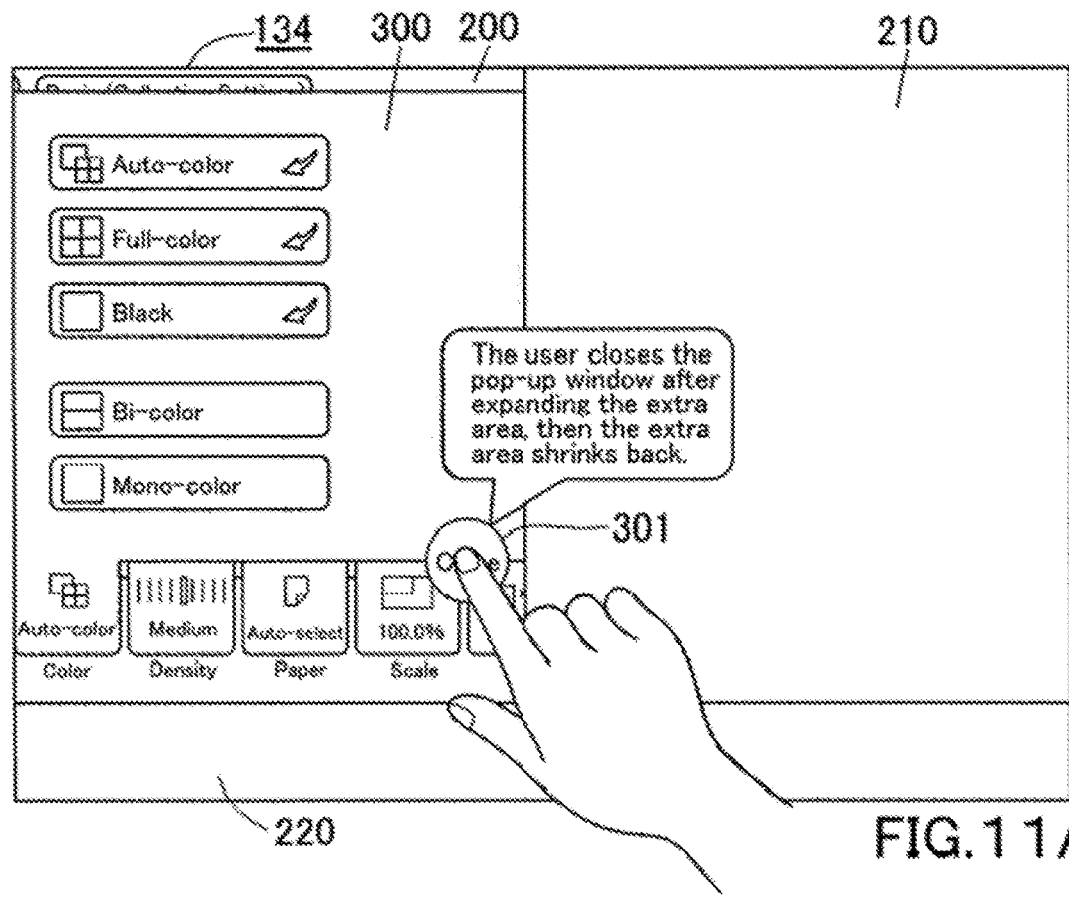
FIGS. 11A and 11B are explanatory views of a screen display control operation according to still yet another embodiment of the present invention.
Figure 11B:
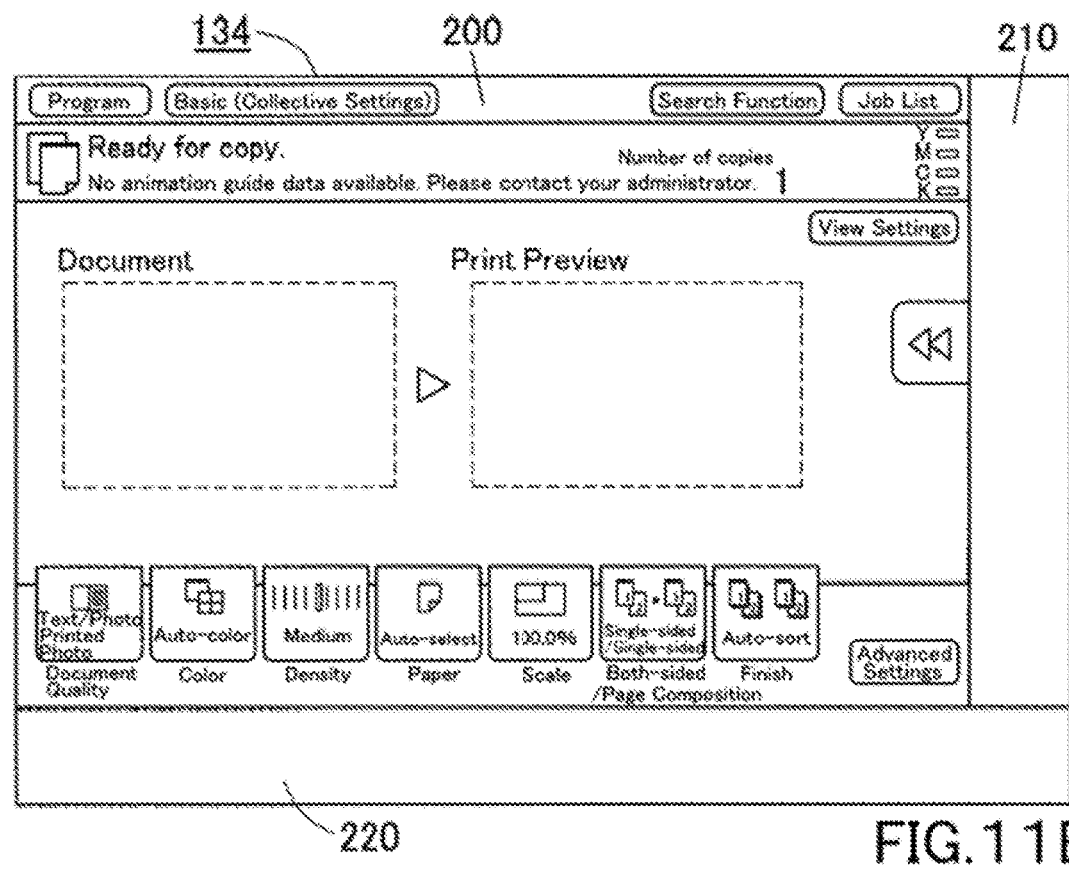

FIGS. 11A and 11B are explanatory views of a screen display control operation according to still yet another embodiment of the present invention. In this embodiment, the user switches the base screen in the base area 200 to the next screen after expanding the extra area 210. Upon this manipulation, the extra area 210 automatically shrinks back to allow the next screen to fully appear.

For example, as referred to FIG. 11A, after expanding the extra area 210, the user touches a "Close" key 301 in the pop-up window 300 that is displayed in the base area 200. Upon this manipulation, the expansion of the extra area 210 is automatically canceled; that is, as referred to FIG. 11B, the extra area 210 is restored to an original state as it was before expanded, which allows the base screen to fully appear in the base area 200 without the pop-up window 300. Also, after expanding the extra area 210, the user can open a pop-up window as the next screen; in this case, the extra area 210 is automatically resized to allow this pop-up window to fully appear.

As described above, after expanding the extra area 210, the user switches the base screen in the base area 200 to the next screen. Upon this manipulation, the extra area 210 automatically shrinks back to allow the next screen to fully appear. If the next screen is a pop-up window, the extra area 210 is automatically resized to allow this pop-up window to fully appear. Thus, this does not bother the user anymore about reducing the size of the extra area 210 for the visibility of the next screen, facilitating the manipulation.

Figure 12A:
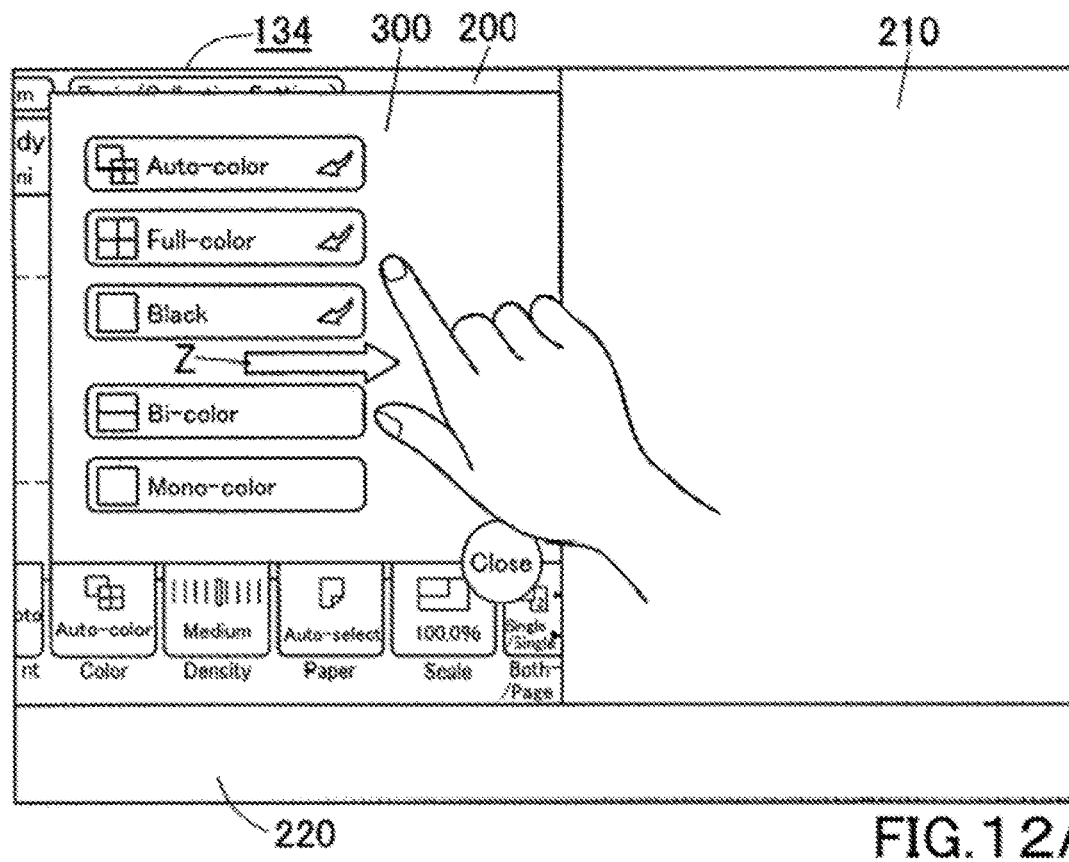
FIGS. 12A and 12B are explanatory views of a screen display control operation according to further still yet another embodiment of the present invention.
Figure 12B:
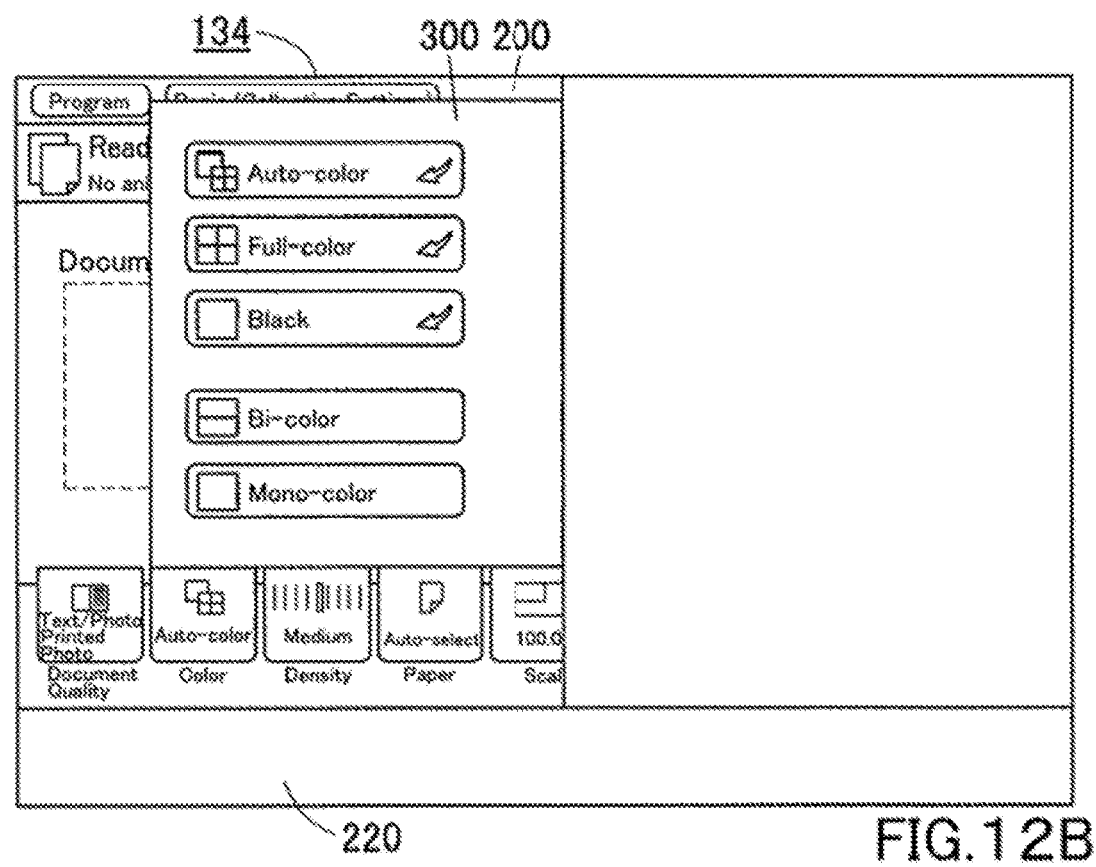

FIGS. 12A and 12B are explanatory views of a screen display control operation according to further still yet another embodiment of the present invention. In this embodiment, as referred to FIG. 12A, after expanding the extra area 210, the user touches the base area 200 with a finger and slides the finger to a direction Z that is toward the extra area 210. Upon this manipulation, the extra area 210 remains unchanged while the base screen displayed in the base area 200 slides in the same direction as the finger slides, as referred to FIG. 12B. Upon this manipulation, i.e., touching the base area 200 with a finger and slides the finger toward the extra area 210, the extra area 210 may remain unchanged while the base screen in the base area 200 slides, as described above in this embodiment; alternatively, upon this manipulation, the extra area 210 may shrink back while the base screen in the base area 200 slides. This is a matter of configuration by default or by a user.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c)

structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A display device comprising:
    a display;
    a touch panel disposed on the display;
    a memory that stores screen configuration information, the screen configuration information essentially including information of a base area of a fixed size and an extra area of an unfixed size, the base area for displaying a first screen therein, the extra area for displaying a second screen therein;
    a retrieving portion that retrieves the screen configuration information from the memory;
    a display processor that allocates the base area in the fixed size in an image displayable area of the display on the basis of a reference point of the screen of the display with reference to the screen configuration information retrieved by the retrieving portion and displays the first screen in the allocated base area, and that further allocates the extra area in an area other than the base area and displays the second screen in the allocated extra area when the size of the image displayable area of the display is larger than the size of the base area; and
    a judgment portion that judges whether or not a user expands the extra area displaying the second screen therein to stretch the extra area toward the base area on the touch panel, by performing a first operation or a second operation, the first operation consisting of touching a point in the extra area and sliding the touch point toward the base area, the second operation consisting of touching a point in the base area and sliding the touch point away from the extra area,
    wherein, if the judgment portion judges that a user performs the first operation, the display processor expands the extra area by stretching the extra area toward the base area and displaying the second screen in the expanded extra area, and keeps the first screen motionless, the first screen being displayed in the base area, until the extra area reaches a predetermined key in the first screen, and expands the extra area and slides the first screen away from the extra area after the extra area reaches the predetermined key, and
    wherein, if the judgment portion judges that a user performs the second operation, the display processor expands the extra area by stretching the extra area toward the base area and displaying the second screen in the expanded extra area, and slides the first screen away from the extra area.

2. The display device according to claim 1, wherein:
    the judgment portion judges that a user expands the extra area while a pop-up window is displayed in the base area; and
    the display processor expands the extra area and slides the first screen away from the extra area until the extra area reaches a side of the pop-up window, the side being adjacent to the extra area, and the opposite side of the pop-up window reaches one side of the image displayable area of the display.

3. The display device according to claim 1, wherein:
    the judgment portion judges that a user expands the extra area; and
    if the user further switches the first screen to the next screen by operating a first pop-up window displayed in the base area and the next screen is a second pop-up window, the display processor resizes the extra area to allow the second pop-up window to fully appear; if the user further switches the first screen to the next screen by operating a first pop-up window displayed in the base area and the next screen is not a second pop-up window, the display processor restores the extra area to an original state as it was before expanded, the original state allowing the first screen to fully appear in the base area.

4. The display device according to claim 1, wherein:
    the judgment portion judges that a user expands the extra area; and
    when the user further touches the base area and slides the touch point toward the extra area, the display processor keeps the extra area unchanged and slides the first screen toward the extra area, the first screen being displayed in the base area.

5. The display device according to claim 1, wherein the display processor is capable of expanding the extra area until a side of the extra area, the side being adjacent to the base area, reaches one side of the image displayable area of the display.

6. A screen display method for a display device, the display device comprising:
    a display;
    a touch panel disposed on the display; and
    a memory that stores screen configuration information, the screen configuration information essentially including information of a base area of a fixed size and an extra area of an unfixed size, the base area for displaying a first screen therein, the extra area for displaying a second screen therein,
    the screen display method comprising the following steps of the display device:
    retrieving the screen configuration information from the memory;
    allocating the base area in the fixed size in an image displayable area of the display on the basis of a reference point of the screen of the display with reference to the retrieved screen configuration information and displaying the first screen in the allocated base area, and further allocating the extra area in an area other than the base area and displaying the second screen in the allocated extra area when the size of the image displayable area of the display is larger than the size of the base area; and
    judging whether or not a user expands the extra area displaying the second screen therein to stretch the extra area toward the base area on the touch panel, by performing a first operation or a second operation, the first operation consisting of touching a point in the extra area and sliding the touch point toward the base area, the second operation consisting of touching a point in the base area and sliding the touch point away from the extra area, wherein, if it is judged that a user performs the first operation, the extra area expands by the extra area stretching toward the base area and the second screen being displayed in the expanded extra area, and the first screen displayed in the base area remains motionless, until the extra area reaches a predetermined key in the first screen, and the extra area expands and the first screen slides away from the extra area after the extra area reaches the predetermined key, and wherein, if it is judged that a user performs the second operation, the extra area expands by the extra area stretching toward the base area and the second screen being displayed in the expanded extra area, and the first screen slides away from the extra area.

7. A non-transitory computer-readable recording medium storing a screen display program to be run by a computer of a display device, the display device comprising a display and a touch panel disposed on the display, the screen display program including screen configuration information, the screen configuration information essentially including information of a base area of a fixed size and an extra area of an unfixed size, the base area for displaying a first screen therein, the extra area for displaying a second screen therein, the screen display program making the computer to execute:

retrieving the screen configuration information from the memory;

allocating the base area in the fixed size in an image displayable area of the display on the basis of a reference point of the screen of the display with reference to the retrieved screen configuration information and displaying the first screen in the allocated base area, and further allocating the extra area in an area other than the base area and displaying the second screen in the allocated extra area when the size of the image displayable area of the display is larger than the size of the base area; and judging whether or not a user expands the extra area displaying the second screen therein to stretch the extra area toward the base area on the touch panel, by performing a first operation or a second operation, the first operation consisting of touching a point in the extra area and sliding the touch point toward the base area, the second operation consisting of touching a point in the base area and sliding the touch point away from the extra area, wherein, if it is judged that a user performs the first operation, the extra area expands Ly the extra area stretching toward the base area and the second screen being displayed in the expanded extra area, and the first screen displayed in the base area remains motionless, until the extra area reaches a predetermined key in the first screen, and the extra area expands and the first screen slides away from the extra area after the extra area reaches the predetermined key, and wherein, if it is judged that a user performs the second operation, the extra area expands by the extra area stretching toward the base area and the second screen being displayed in the expanded extra area, and the first screen slides away from the extra area.

8. The non-transitory computer-readable recording medium according to claim 7, storing the screen display program to be run by the computer, wherein:

it is judged that a user expands the extra area while a pop-up window is displayed in the base area; and the extra area expands and the first screen slides away from the extra area until the extra area reaches a side of the pop-up window, the side being adjacent to the extra area, and the opposite side of the pop-up window reaches one side of the image displayable area of the display.

9. The non-transitory computer-readable recording medium according to claim 7, storing the screen display program to be run by the computer, wherein:

it is judged that a user expands the extra area; and if the user further switches the first screen to the next screen by operating a first pop-up window displayed in the base area and the next screen is a second pop-up window, the extra area is resized to allow the second pop-up window to fully appear; if the user further switches the first screen to the next screen by operating a first pop-up window displayed in the base area and the next screen is not a second pop-up window, the extra area is restored to an original state as it was before expanded, the original state allowing the first screen to fully appear in the base area.

10. The non-transitory computer-readable recording medium according to claim 7, storing the screen display program to be run by the computer, wherein:

it is judged that a user expands the extra area;

when the user further touches the base area and slides the touch point toward the extra area, the extra area remains unchanged and the first screen displayed in the base area slides toward the extra area.

11. The non-transitory computer-readable recording medium according to claim 7, storing the screen display program to be run by the computer, wherein the extra area is capable of expanding until a side of the extra area, the side being adjacent to the base area, reaches one side of the image displayable area of the display.

12. An image processing apparatus comprising the display device according to claim 1.

* * * * *